(12) United States Patent
Ma

(10) Patent No.: US 8,014,839 B2
(45) Date of Patent: Sep. 6, 2011

(54) MOBILE TELEPHONE

(75) Inventor: Jun-Chao Ma, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 380 days.

(21) Appl. No.: 12/274,499

(22) Filed: Nov. 20, 2008

(65) Prior Publication Data

US 2009/0298559 A1 Dec. 3, 2009

(30) Foreign Application Priority Data

May 30, 2008 (CN) .......................... 2008 1 0301855

(51) Int. Cl.
*H04M 1/00* (2006.01)
(52) U.S. Cl. ............... 455/575.3; 455/575.4; 455/575.1; 16/264; 16/338; 16/367
(58) Field of Classification Search ............... 455/575.3, 455/575.4, 575.1; 16/264, 338, 367
See application file for complete search history.

(56) References Cited

U.S. PATENT DOCUMENTS

| | | | | |
|---|---|---|---|---|
| 6,694,569 B2 * | 2/2004 | Chien et al. | ...................... | 16/367 |
| 6,728,557 B1 * | 4/2004 | Tracy et al. | ................. | 455/575.3 |
| 6,742,221 B2 * | 6/2004 | Lu et al. | ........................... | 16/367 |
| 7,165,291 B2 * | 1/2007 | Gan | ................................ | 16/367 |
| 7,168,135 B2 * | 1/2007 | Jung et al. | ........................ | 16/367 |
| 7,287,302 B2 * | 10/2007 | Park et al. | ........................ | 16/330 |
| 7,334,294 B2 * | 2/2008 | Liu et al. | ........................ | 16/307 |
| 7,346,375 B2 * | 3/2008 | Sato et al. | ................. | 455/575.3 |
| 7,356,881 B2 * | 4/2008 | Park et al. | ........................ | 16/367 |
| 7,373,692 B2 * | 5/2008 | Kfoury | ........................... | 16/308 |
| 7,401,383 B2 * | 7/2008 | Pan | ................................ | 16/367 |
| 7,559,117 B2 * | 7/2009 | Chien | ............................ | 16/367 |
| 7,565,717 B2 * | 7/2009 | Duan et al. | ..................... | 16/303 |
| 7,578,030 B2 * | 8/2009 | Duan et al. | ..................... | 16/330 |
| 7,600,298 B2 * | 10/2009 | Chen et al. | ..................... | 16/367 |
| 7,690,082 B2 * | 4/2010 | Chuang | ........................... | 16/367 |
| 7,703,177 B2 * | 4/2010 | Kim | ................................ | 16/366 |
| 7,725,987 B2 * | 6/2010 | Duan et al. | ..................... | 16/330 |
| 7,725,989 B2 * | 6/2010 | Huang et al. | .................... | 16/367 |
| 7,954,203 B2 * | 6/2011 | Chen et al. | ..................... | 16/367 |
| 2003/0167601 A1 * | 9/2003 | Chen | ............................... | 16/367 |
| 2004/0083577 A1 * | 5/2004 | Lu et al. | .......................... | 16/367 |
| 2004/0121825 A1 * | 6/2004 | Ma et al. | .................... | 455/575.4 |
| 2004/0143936 A1 * | 7/2004 | Hsu | ................................ | 16/367 |
| 2004/0198474 A1 * | 10/2004 | Jung et al. | ................. | 455/575.1 |
| 2004/0200038 A1 * | 10/2004 | Kim | ................................ | 16/367 |
| 2004/0219957 A1 * | 11/2004 | Nishijima et al. | ......... | 455/575.3 |
| 2005/0064917 A1 * | 3/2005 | Peng et al. | ................. | 455/575.1 |
| 2005/0124392 A1 * | 6/2005 | Jeong | ........................ | 455/575.1 |
| 2005/0245294 A1 * | 11/2005 | Gupte et al. | ............... | 455/575.1 |
| 2005/0287953 A1 | 12/2005 | Ikeda et al. | | |
| 2006/0205446 A1 * | 9/2006 | Lee et al. | ..................... | 455/575.1 |
| 2008/0034550 A1 * | 2/2008 | Chang et al. | .................... | 16/367 |
| 2008/0078062 A1 * | 4/2008 | Hsu et al. | ........................ | 16/367 |
| 2010/0011539 A1 * | 1/2010 | Huang et al. | .................... | 16/367 |

* cited by examiner

*Primary Examiner* — Charles Shedrick

(74) *Attorney, Agent, or Firm* — Altis Law Group, Inc.

(57) ABSTRACT

A mobile telephone includes a first body, a connecting portion, and a second body. A keyboard is formed the first body. The connecting portion is secured on the first body and rotatable relative to the first body about a first axis. The second body is secured on the connecting portion and rotatable relative to the connecting portion about a second axis. The second axis is substantially perpendicular to the first axis.

8 Claims, 6 Drawing Sheets

MOBILE TELEPHONE

BACKGROUND

1. Technical Field

The present disclosure relates to a mobile telephone.

2. Description of the Related Art

A mobile telephone usually comprises a first body and a second body rotatably secured to the first body. A keyboard is secured on the first body. An LCD display is secured on the second body. In use, the LCD display can only rotate relative to the first body about an axis.

Therefore, there is room for improvement within the art.

DETAILED DESCRIPTION OF THE EMBODIMENTS

Figure 1:
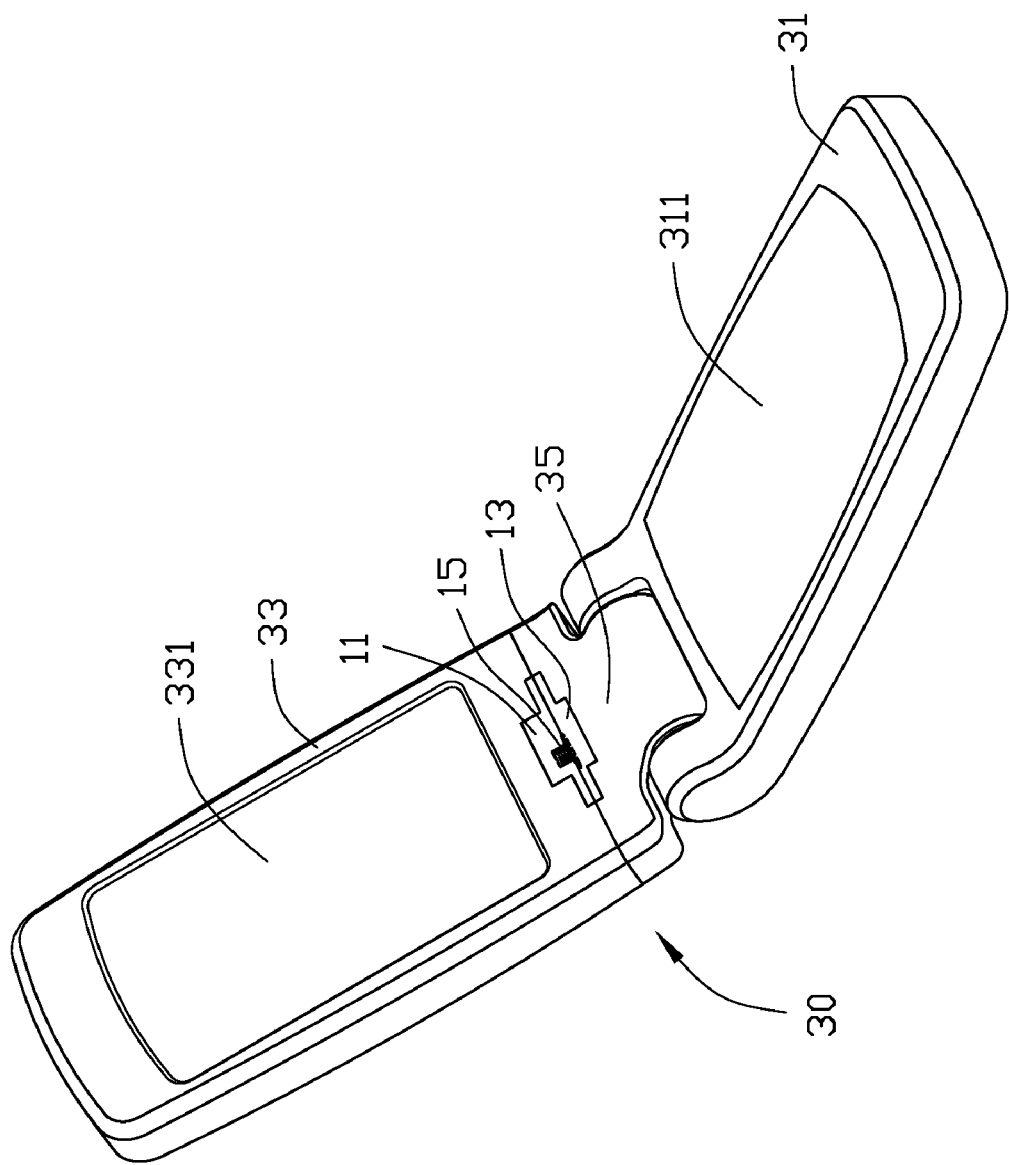
FIG. 1 is an isometric view of one embodiment of a mobile telephone, the mobile telephone including a first body, a connecting portion, and a second body.

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

Referring to FIG. 1, one embodiment of a mobile telephone 30 includes a first body 31, a second body 33, and a connecting portion 35 rotatably secured on the first body 31. A first securing block 13 is mounted on the connecting portion 35. A second securing block 11 is secured on the second body 33. In the illustrated embodiment, a keyboard 311, a motherboard (not shown), and other electronic elements are installed in the first body 31, an LCD display 331 is positioned in the second body 33.

Figure 2:
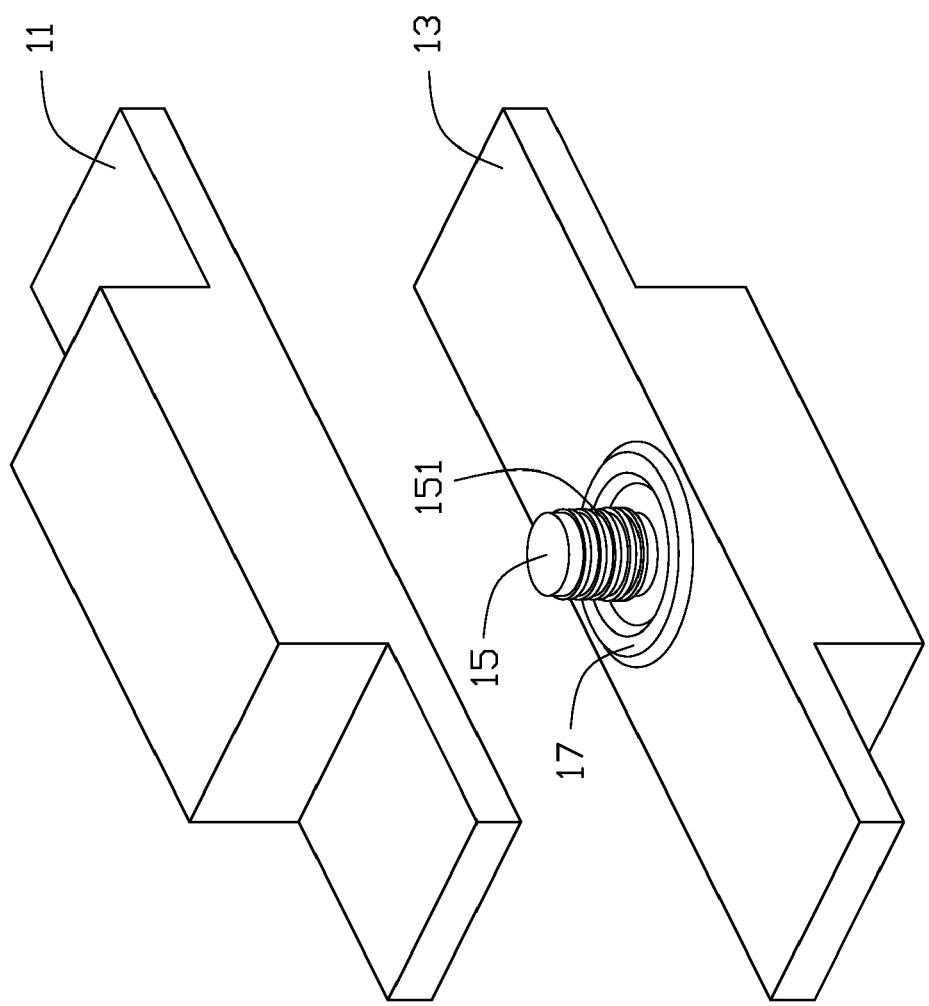
FIG. 2 is an exploded, isometric view of a first securing block of the connecting portion of FIG. 1 and a second securing block of the second body of FIG. 1.
Figure 4:
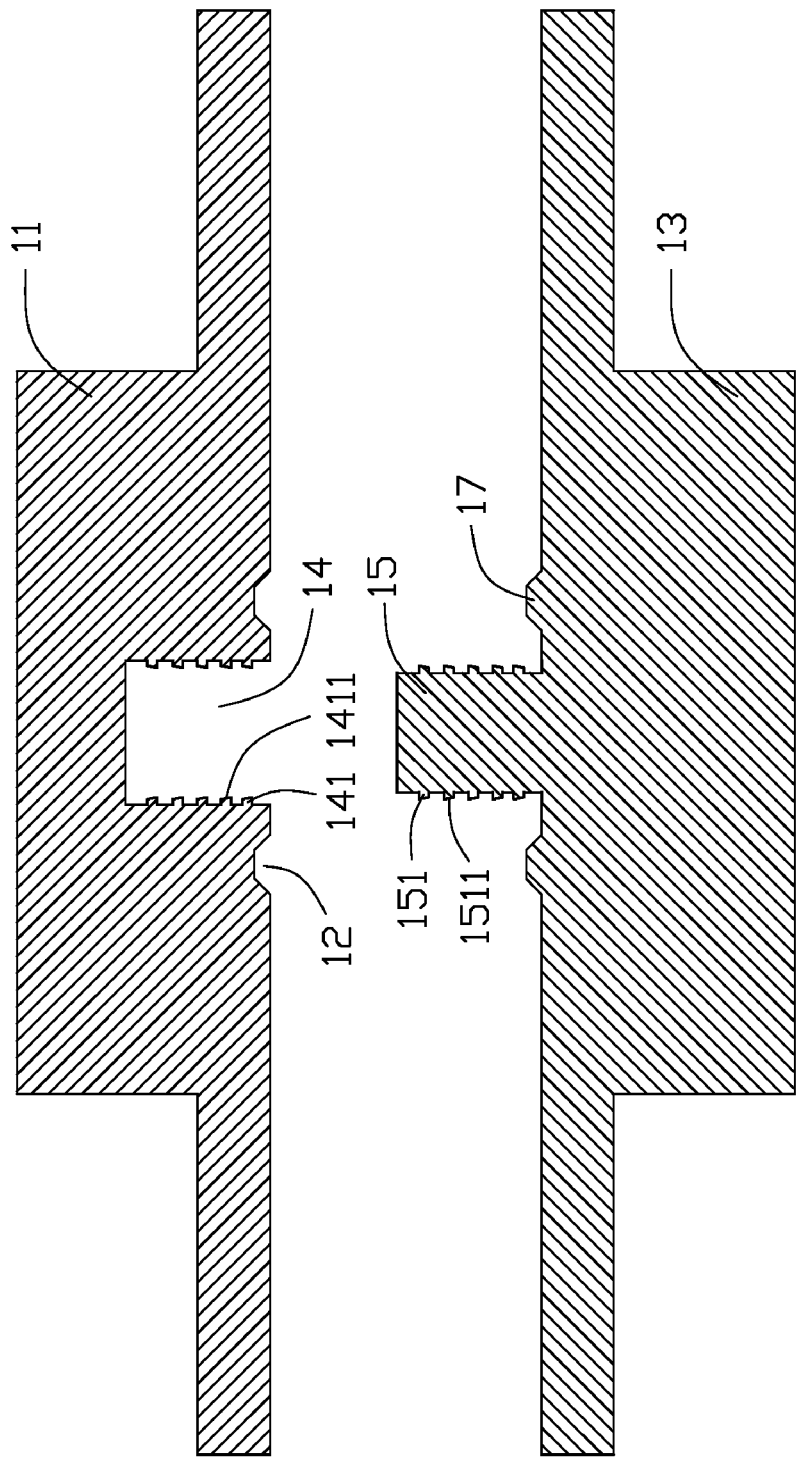
FIG. 4 is a cross-sectional view of the first and second securing blocks of FIG. 2.

Referring also to FIGS. 2 and 4, a post 15 protrudes from the securing block 13. A plurality of ring shaped flanges 151 is formed on an outer surface of the post 15. Each of the ring shaped flanges 151 has a slanted surface 1511. A ring shaped protrusion 17 protrudes from the securing block 13 and surrounds the post 15.

Figure 3:
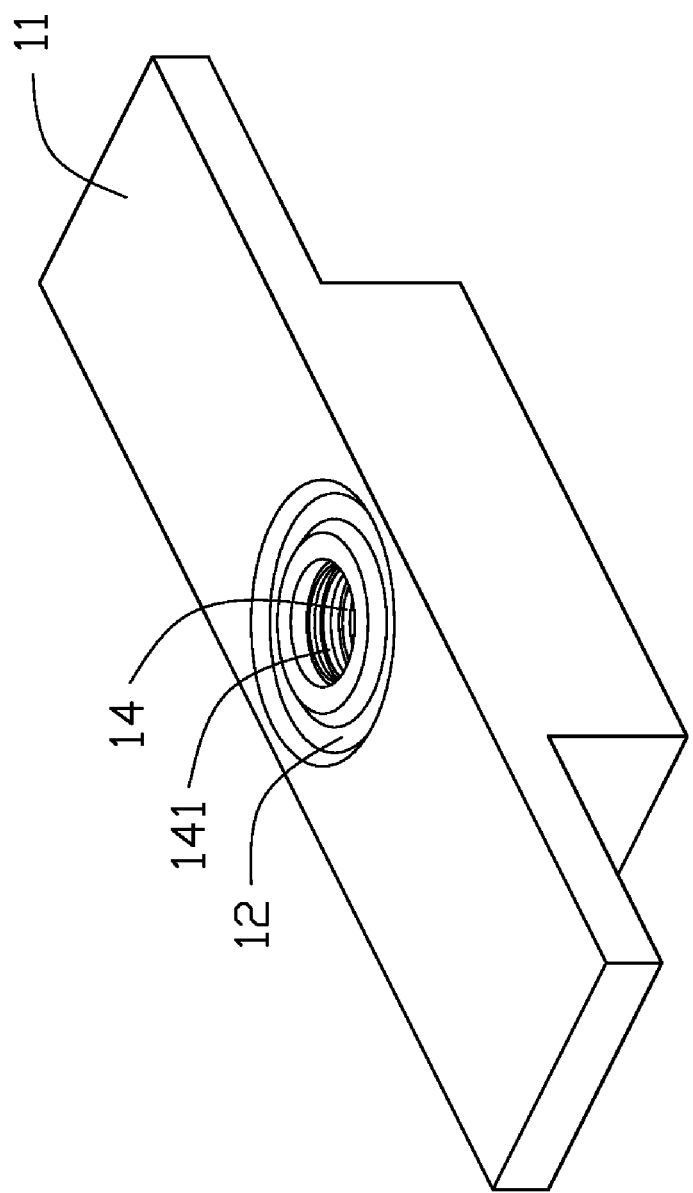
FIG. 3 is an isometric view of the second securing block of FIG. 2, but viewed from another aspect.

Referring also to FIG. 3, an opening 14 is defined in the second securing block 11 for receiving the post 15 of the first securing block 13. A plurality of ring shaped flanges 141 protrudes from an inner surface of the opening 14 corresponding to the ring shaped flanges 151 of the post 15. Each of the ring shaped flanges 141 of the opening 14 has a slanted surface 1411. A ring shaped depression 12 is defined in the second securing block 11 for receiving the ring shaped protrusion 17 of the first securing block 13 therein.

Figure 5:
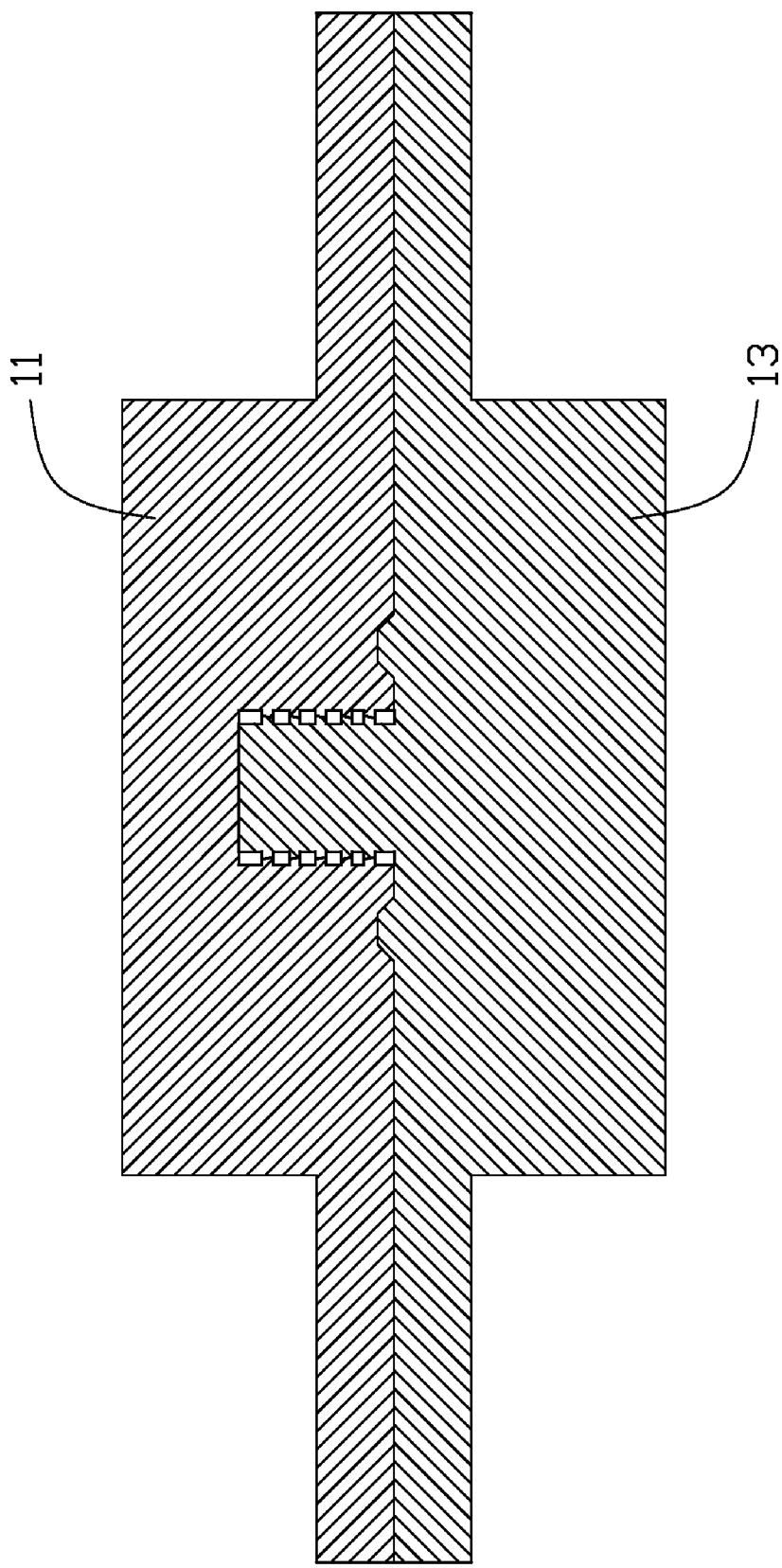
FIG. 5 is similar to FIG. 4, but showing with the first and second securing blocks assembled together.

Referring also to FIG. 5, the connecting portion 35 is rotatably secured on the first body 31, and the second body 33 is rotatably secured on the connecting portion 35. The post 15 of the first securing block 13 is received in the opening 14 of the second securing block 11. The ring shaped flanges 151 of the post 15 engages with the ring shaped flanges 141 of the opening 14. The slanted surfaces 1511 of the ring shaped flanges 151 match with the slanted surfaces 1411 of the ring shaped flanges 141. The ring shaped protrusion 17 of the first securing block 13 engages with the ring shaped depression 12 of the second block 11.

Figure 6:
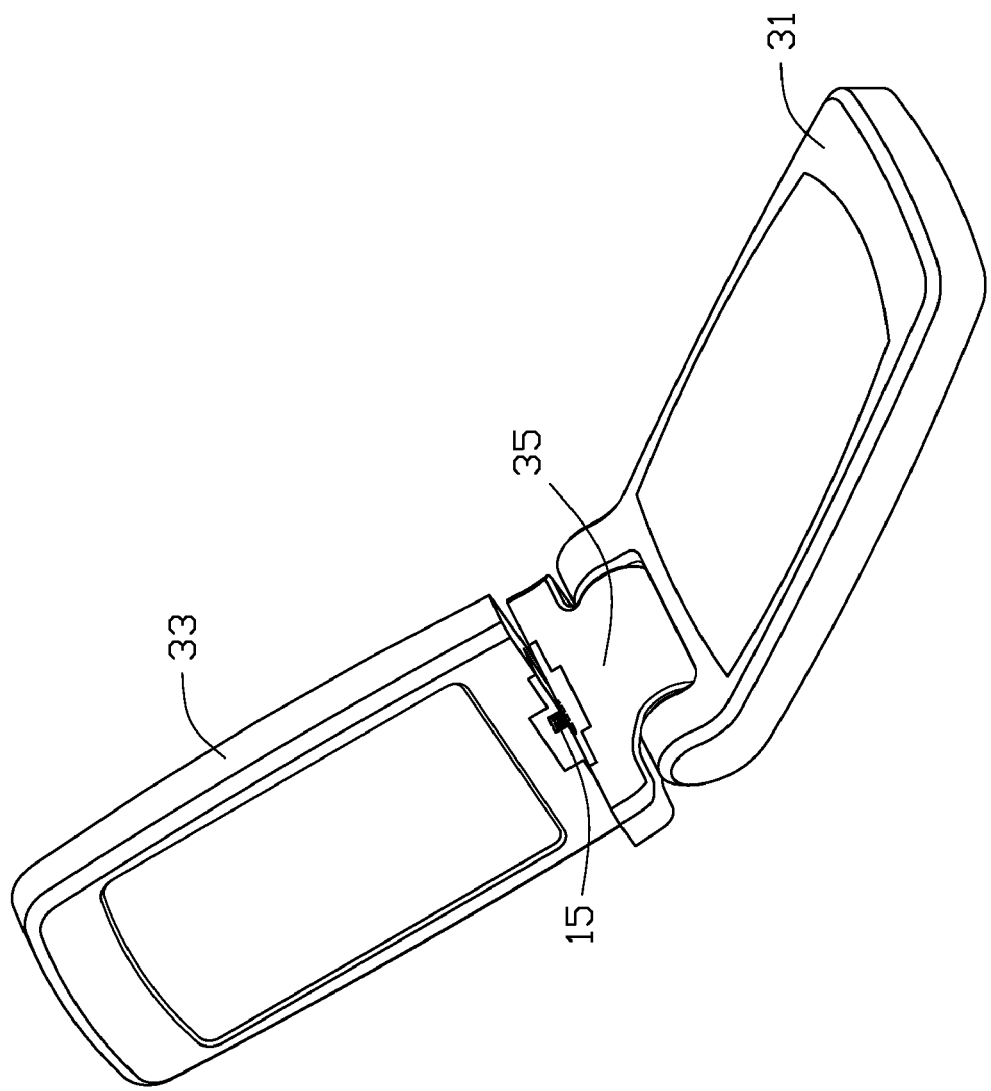
FIG. 6 is similar to FIG. 1, but showing the second body rotated about the connecting portion.

Referring also to FIG. 6, when the first body 31, the connecting portion 35, and the second body 33 are assembled together, the connecting portion 35 is rotatable relative to the first body 31 about a first axis, and the second body 33 is rotatable relative to the connecting portion 35 about a second axis substantially perpendicular to the first axis.

When the second body 33 is rotated relative to the connecting portion 35, the slanted surfaces 1511 of the flanges 151 of the first securing block 13 stably abut the slanted surfaces 1411 of the flanges 141 of the second body 11. The protrusion 17 of the first securing block 13 is rotated in the depression 12 of the second securing block 11.

It is to be understood, however, that even though numerous characteristics and advantages have been set forth in the foregoing description of embodiments, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A mobile telephone comprising: a first body; a connecting portion secured on the first body and rotatable relative to the first body about a first axis; the connecting portion comprising a first securing block and a second securing block, a post is located on the first securing block, and a plurality of slanted surfaces is defined on an outer surface of the post; an opening is defined in the second securing block, and a plurality of slanted surfaces is defined on an inner surface of the opening, and a second body secured on the connecting portion and rotatable relative to the connecting portion about a second axis, wherein the second axis is substantially perpendicular to the first axis, and each of the plurality of the slanted surfaces of the post abuts each of the plurality of the slanted surfaces of the opening when the second body is rotated relative to the connecting portion, so as to prevent the second body from rotating relative to the connecting portion around the second axis, wherein the connecting portion comprises a first securing block secured to the connecting portion, and a post extending from the first securing block; the second body comprises a second securing block secured on the second body; an opening is defined in the second securing block for rotatably receiving the post of the first securing block therein.

2. The mobile telephone of claim 1, wherein a plurality of flanges is formed on an outer surface of the post of the first securing block; a plurality of flanges is formed on an inner surface of the opening of the second securing block for engaging with the plurality of flanges of the post.

3. The mobile telephone of claim 2, wherein the plurality of slanted surfaces of the post is disposed on the plurality of flanges of the post, and the plurality of slanted surfaces of the opening is disposed on the plurality of flanges of the opening.

4. The mobile telephone of claim 1, wherein a ring shaped protrusion protrudes from the first securing block and surrounding the post; a ring shaped depression is defined in the second securing block surrounding the opening; the ring shaped protrusion engages with the ring shaped depression when the post of the first securing block is received into the opening of the second securing block.

5. The mobile telephone of claim 1, wherein a keyboard is positioned on the first body and a liquid crystal display is positioned on the second body.

6. A mobile telephone comprising:
a first body; a connecting portion rotatably secured on the first body, the connecting portion comprising a first securing block secured thereon, a post extending from the first securing block; a plurality of ring shaped flanges being formed on an outer surface of the post; and
a second body comprising a securing block secured thereon, the second securing block defining an opening therein, a plurality of ring shaped flanges being formed on an inner surface of the opening; wherein the post of the first securing block is rotatably received into the opening of the second securing block, and the ring shaped flanges of the first securing block are engaged with the ring shaped flanges of the second securing block when the post is received in the opening, wherein the connecting portion is rotatable relative to the first body about a first axis, and the second body is rotatable relative to the connecting portion about a second axis substantially perpendicular to the first axis, wherein a ring shaped protrusion protrudes from the first securing block surrounding the post, a ring shaped depression is defined in the second securing block surrounding the opening; the ring shaped protrusion engages with the ring shaped depression when the post of the first securing block is received into the opening of the second securing block, so as to prevent the second body from moving rotating relative to the connecting portion along around the second axis.

7. The mobile telephone of claim 6, wherein each of the flanges of the post has a slanted surface, and each of the flanges of the opening has a slanted surface for engaging with the slanted surface of each of the flanges of the post.

8. The mobile telephone of claim 6, wherein a keyboard is positioned on the first body and a liquid crystal display is positioned on the second body.

* * * * *